(12) United States Patent
Chauhan et al.

(10) Patent No.: US 7,697,955 B2
(45) Date of Patent: Apr. 13, 2010

(54) CASING FOR AN ELECTRONIC HANDHELD DEVICE

(75) Inventors: Tejal Chauhan, Middlesex (GB); Axel Meyer, Helsinki (FI)

(73) Assignee: Nokia Corporation, Espoo (FI)

( * ) Notice: Subject to any disclaimer, the term of this patent is extended or adjusted under 35 U.S.C. 154(b) by 494 days.

(21) Appl. No.: 10/563,615

(22) PCT Filed: Jul. 8, 2003

(86) PCT No.: PCT/GB03/02927

§ 371 (c)(1),
(2), (4) Date: Oct. 5, 2007

(87) PCT Pub. No.: WO2005/006716

PCT Pub. Date: Jan. 20, 2005

(65) Prior Publication Data

US 2008/0214250 A1     Sep. 4, 2008

(51) Int. Cl.
*H04M 1/00* (2006.01)
(52) U.S. Cl. ............ 455/550.1; 455/575.1; 379/428.01; 379/433.01

(58) Field of Classification Search ............... 455/550.1, 455/575.1; 600/38; 379/428.01, 433.01
See application file for complete search history.

(56) References Cited

U.S. PATENT DOCUMENTS

| 5,982,881 | A | * | 11/1999 | Mischenko | ............ | 379/433.11 |
| 6,435,690 | B1 | * | 8/2002 | Till | ............................. | 362/88 |
| 7,366,555 | B2 | * | 4/2008 | Jokinen et al. | ........... | 455/575.8 |
| 7,456,994 | B2 | * | 11/2008 | Silverbrook et al. | ........ | 358/1.18 |
| 2003/0036362 | A1 | * | 2/2003 | Buesseler et al. | ............. | 455/90 |

FOREIGN PATENT DOCUMENTS

| EP | 1 047 250 A1 | 10/2000 |
| EP | 1 312 999 A2 | 5/2003 |
| WO | WO 01/99481 A2 | 12/2001 |

* cited by examiner

*Primary Examiner*—Lester Kincaid
*Assistant Examiner*—Isaak R Jama
(74) *Attorney, Agent, or Firm*—Harrington & Smith

(57) ABSTRACT

The invention relates to a casing for a handheld device that has an upright axis defining an operation orientation of the device and a diagonal axis. The casing has only two continuous side sweeps meeting at points in line with the diagonal axis. The diagonal axis coincides with the greatest span across the face of the casing.

20 Claims, 6 Drawing Sheets

CASING FOR AN ELECTRONIC HANDHELD DEVICE

The invention relates to handheld devices and ergonomic user interfaces therefor.

There has long been a drive towards ever smaller volume phones for ease of stowage but with an often conflicting requirement to continue to match the ear-mouth spacings of the users of the devices. Slides, flips and clamshells have all provided different solutions to this design dilemma.

Throughout this design era, monoblock design has remained fairly unaltered. The greatest design freedom falling within the realm of changes to the aspect ratio. There have been no other particular solutions to the conflicting requirements of size and ear-mouth distance in monoblock devices.

In accordance with the present invention there is provided a casing for a handheld device defining a generally planar operating face for providing an input mechanism and a display region and having a first axis defining an operation orientation of the device, the casing providing first and second side sweeps confronting each other at respective ends defining the shape of the generally planar operating face and providing discontinuities at their respective confrontations, the alignment of the discontinuities defining a second axis along the longest span of the casing.

By providing a clearly visually defined axis along the longest span of the casing there is scope for innovative user interface arrangements for the devices utilising such casings.

By aligning speaker and microphone outlets along an audio axis substantially coinciding with the longest span, the extent of the device along the viewing axis is not required to suit the ear/mouth spacing convenient to the user.

Even if the speaker and microphone outlets are not arranged in substantial alignment with the longest span, the present invention allows other ergonomic arrangements for the footprint of the device to be realised. The side sweeps provide the device with a casing having ostensibly only two sides making the casing easier to grip and position in the user's hand.

Embodiments of the present invention could perhaps provide for different appearance for devices for right and left handed users respectively.

In embodiments in which the audio axis is arranged along the longest span, the angle between the intersecting axes can be carefully arranged to improve useability of the device. When the viewing and audio axes are misaligned it is desirable that the misalignment is such that the action of placing the casing to the user ear is accomplished in as ergonomic way as possible. In embodiments of the invention, the audio axis is positioned, in terms of the direction of rotation required to take the casing to the user's ear, beyond the viewing axis. In particular arrangements, the axes can be aligned so that the rotation of the device can be provided by movement of the user's arm at the elbow only. This means that the casing rests in the user's hand in the same orientation for both viewing, input, operation and in-call communication. Although some movement at the wrist may be possible, the device could be moved from in front of the user's eye's to their ear without adjusting the wrist. This makes for comfortable operation and in-call use of the device.

The adjustment of the wrist could be considered in terms of the alignment of the fingers or palm of the hand of the user relative to the direction or extent of the lower arm of the user. By maintaining the same line down the arm and through the wrist for both viewing and listening, little strain is put on the user's wrist for operation of the device. If considering the plane of the hand, in embodiments of the invention no lateral movement of the hand would be required. In addition it may be possible to move the device from viewing to listening or speaking without twisting the wrist about the axis of the lower arm.

In embodiments of the invention, the longest span may be exaggerated by extending the location at which the respective side sweeps confront each other.

In many designs of a generally rectangular arrangement the greatest span will coincide with a diagonal across the face. As long as one of the diagonals provides for adequate spacing of the speaker and microphone outlets, there are no constraints on the dimensions of the other diagonal. In accordance with embodiments of the present invention this can accordingly take any suitable arrangement. One such arrangement in embodiments of the invention providing rounded corners which allow the device to be more comfortably held in position in the hand. The points and curves of a casing can be used to direct the placement of the device in the users hand for proper operation and to avoid interference with transmission characteristics.

The aspect ratio of the device will affect where the two axes intersect. With an aspect ratio giving the device a generally elongate rectangular or oblong appearance, the intersection of the diagonal with a generally upright visual axis will occur at substantially the centre of the face of the casing. For this elongate arrangement, this region may carry input elements of the device. If, however, as in one embodiment of the invention, the rectangular shape is generally square in arrangement with the display located at the centre of the face of one of the casings, the two axes may intersect in the display region of the device. In this arrangement with the respective sweeping sides, the footprint of the casing could be considered to be substantially eye-shaped.

The confrontation between respective side sweeps may occur as a result of a physical convergence or meeting of the respective side sweeps of the casing carrying the engine of a device. It may, however, be visually created as a result of external elements carried by the engine casing.

The invention will be described in greater detail with reference to FIGS. 1 to 8 of the accompanying drawings.

The handheld communications device illustrated in FIGS. 1 to 5 has two principle or main functions. In the example illustrated these are to make voice calls, for more traditional mobile phone functions, and to take photographs. The two functionalities may be supplemented by other functionalities known to the skilled man e.g. data communications, multimedia messaging, navigation etc. The functionalities can also be combined by, for example, taking a photograph and sending it to another via a data link. This may be an over the air link utilising the mobile communications facility of the device.

Figure 6:
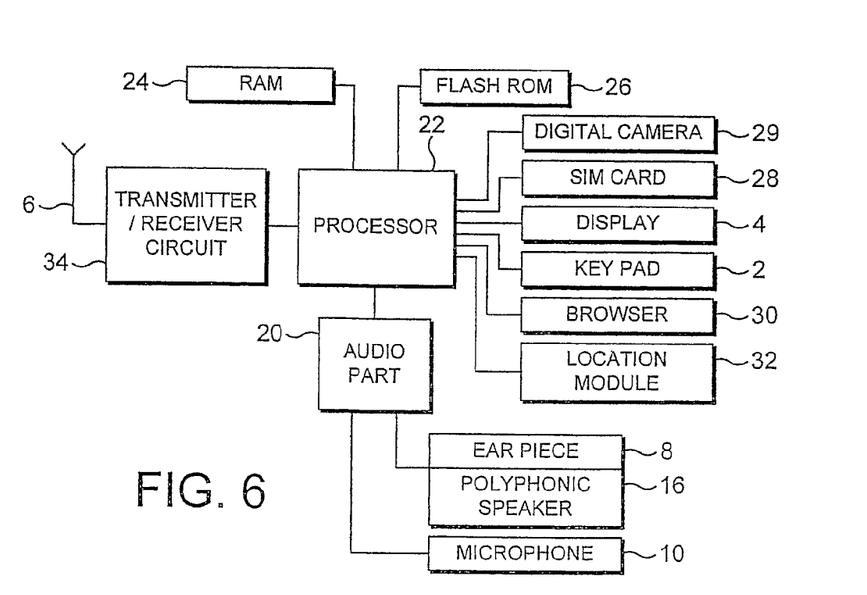
FIG. 6 is a functional diagram showing the functional blocks of a communications device in accordance with embodiments of the invention.
Figure 7:
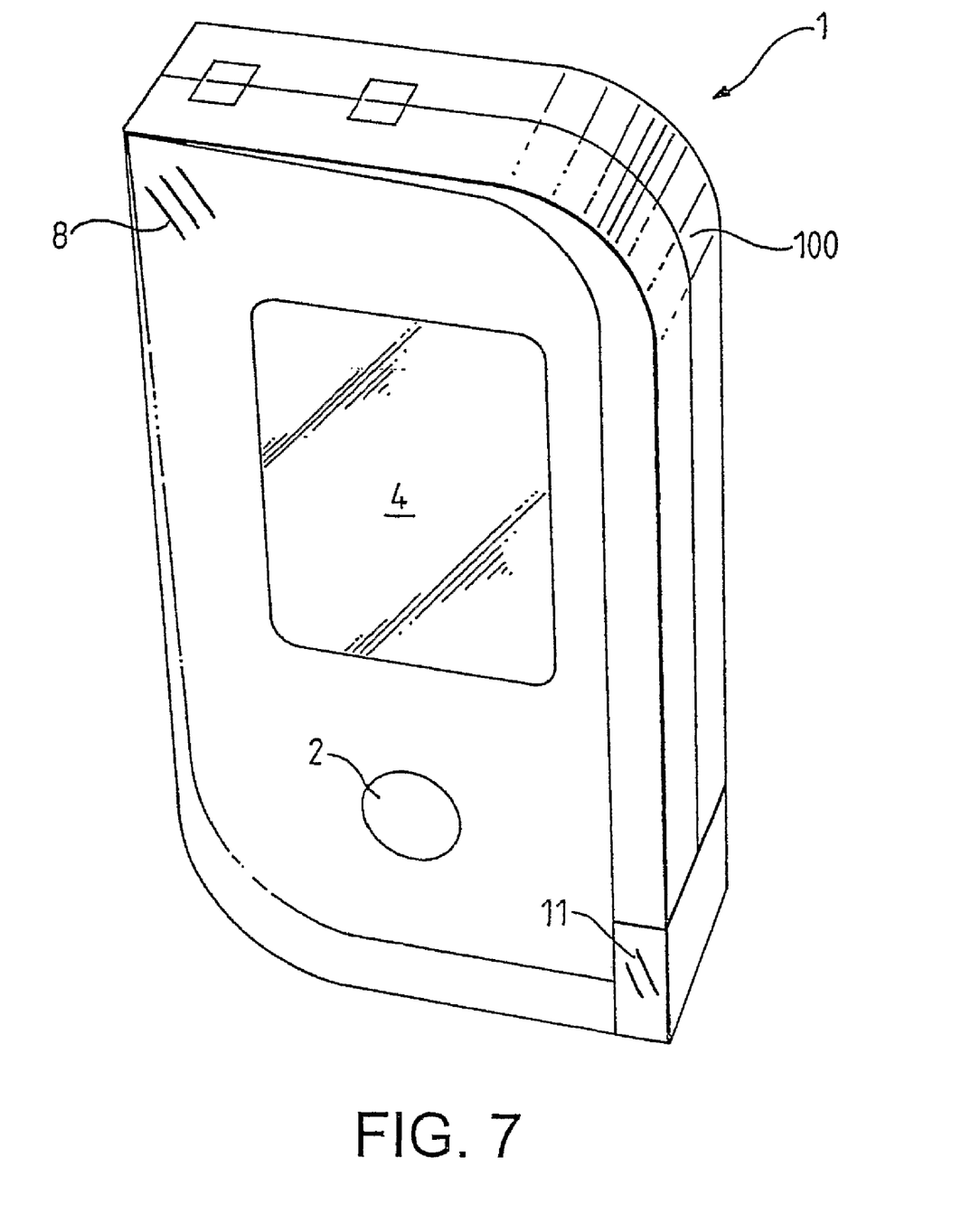
FIG. 7 is a perspective view of one face of another embodiment of the present invention having a different aspect ratio.

The functional aspects of the communication device can be seen in FIG. 6. The device 1 includes a key array 2, a display 4, an antenna 6, an ear piece and speaker 8 on a communications face 12 and a lens 14 of a digital camera 29 and polyphonic speaker 16 on the imaging face 18. The microphone 10 is towards the end of the casing and an aperture 11 is provided in the side of the casing to pick up the user's speech. A corresponding aperture 81 is provided in the trim. The microphone outlets are not directly located on the longest span of the device, but the benefit of the longer span is still enjoyed. The communication device 1 is adapted for communication via a wireless telecommunication network. The microphone records the user's speech, and the analogue signals formed thereby are A/D converted by an A/D converter before the speech is encoded in an audio part 20. The encoded speech signal is transferred to processor 22. The processor may support software in the phone. The processor also forms the interface to peripheral units of the apparatus. These include a Random Access Memory (RAM) 24 and a Flash Read Only Memory (ROM) 26, a SIM card 28, the display 4, the digital camera 29 and the key array 2, and perhaps a browser application 30, and a location module 32.

The digital camera 29 allows the user to record images and provides suitable outputs to allow the download of the recorded images to a computer for manipulation and printing. The stored photographic data can also be sent to other destinations either over-the-air using the communications capability of the device or through a hardwired or landline link via e.g. the internet.

The processor communicates with a transceiver 34, e.g. a circuit, which is adapted to send and receive messages in a telecommunication network. The telecommunications network may be a GSM or W-CDMA network, but the invention may also be applied in connection with any other network, including but not limited to other kinds of wireless networks and various forms of cordless phone systems or in dual band phones accessing sets of these systems or networks. The audio part speech-decodes the signal, which is transferred from the processor to the earpiece via a D/A converter.

Devices according to embodiments of this invention may have a radical appearance. The casing does not have traditional mirror symmetry but is rather asymmetric although the main features of the design have predominantly 180 degree rotational symmetry.

There are two sides that would traditionally be termed A-sides. The first is the mobile phone/communications A-side 12. This can be seen in FIGS. 1 and 3. This side has 'screen centricity' i.e. there is a central screen. In the embodiment illustrated the input region includes a split keymat 3, with keys running either side of the screen 4. In one particular embodiment it is the alphanumeric keys that are split in this fashion. Other arrangements of the keys are clearly possible. The arrangement of the keys provides the advantage that they are close to the screen, this may be useful especially if a number of different softkeys are to be used in conjunction with the alpha numeric keys. Also in this particular embodiment the screen is in portrait, although other arrangements including a landscape arrangement are clearly within the scope of the skilled man. The orientation of the screen dictates the most comfortable viewing and data entry orientation of the device.

Figure 1:
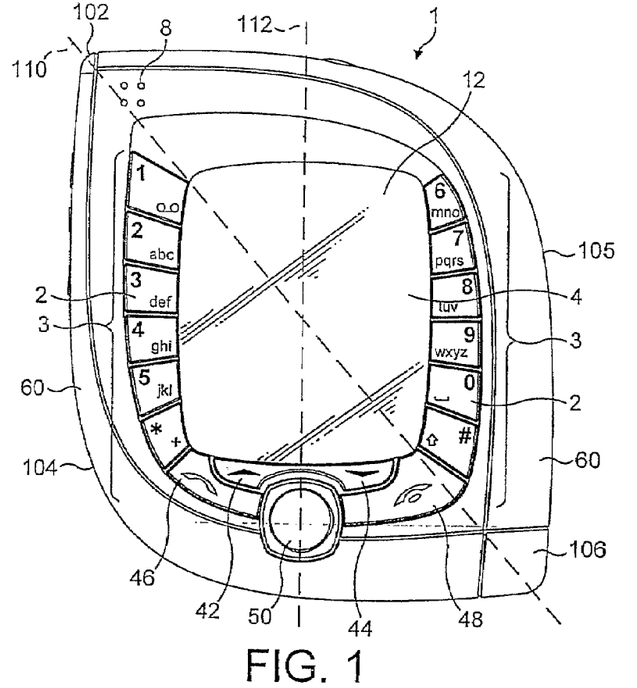
FIG. 1 is a plan view of a first face of an embodiment of the present invention.
Figure 3:
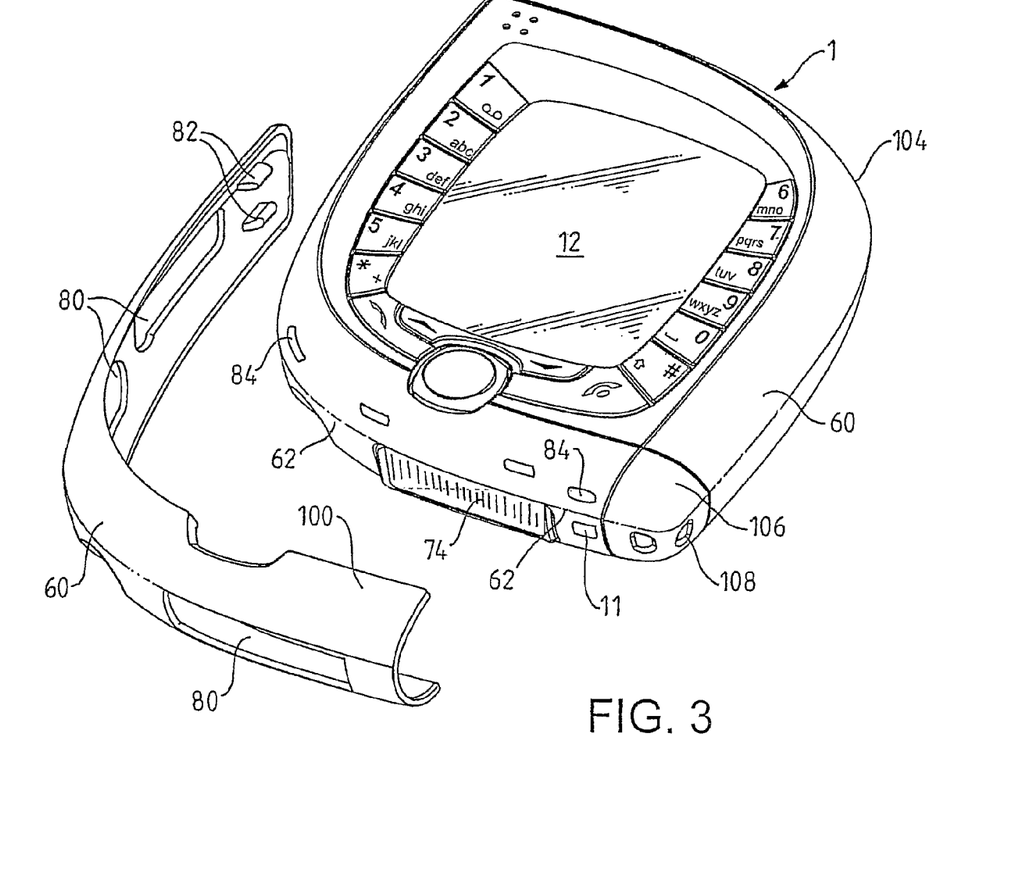
FIG. 3 is a perspective view of the embodiment of FIG. 1 showing the same face with one of the trims exploded off.

There may be additional functional keys 42, 44, 46, 48, 50 located to the bottom of the screen. These are placed in more traditional locations with the soft keys 42, 44 being located close to the screen. The send and end call buttons 46, 48 are also located below the screen. An 8-way key or joystick 50 may also be provided at the bottom of the screen for ease of input for e.g. playing games. Also on the communications face 12 are located the earpiece 8 and the mouth piece 10. These are diametrically opposed on the furthest corners of the device to provide maximum mouth to ear distance for voice calls.

Figure 4:
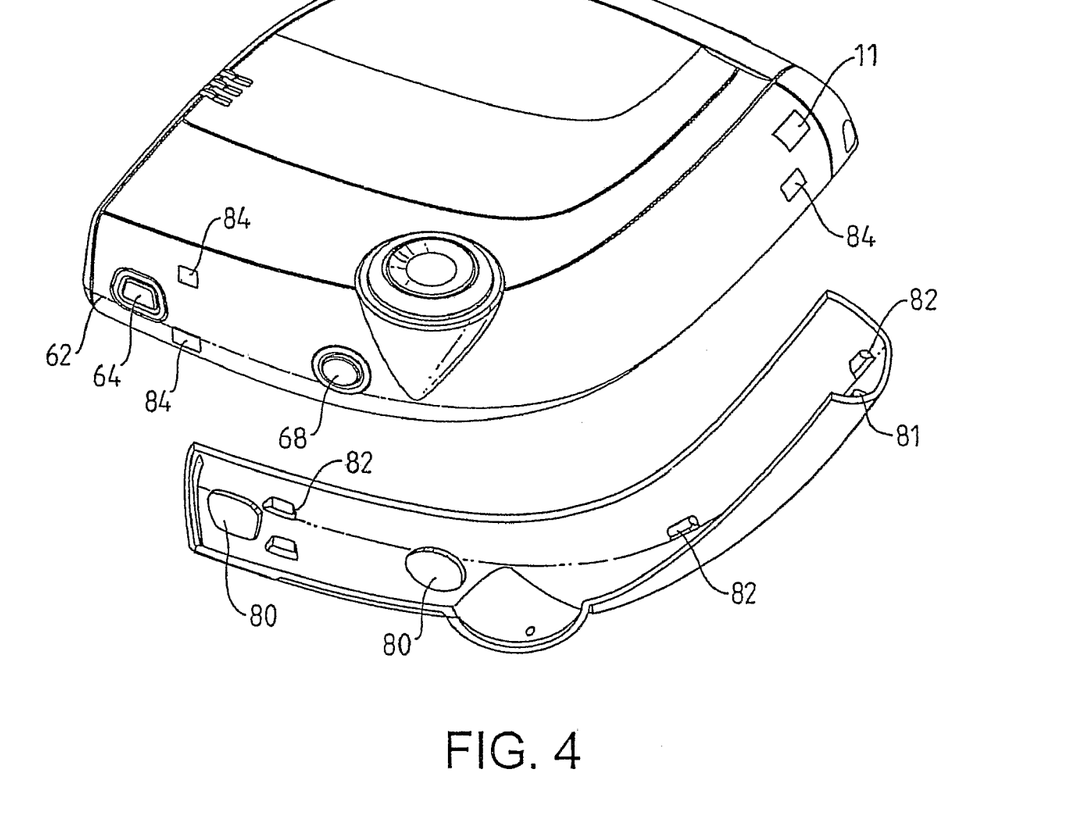
FIG. 4 is a perspective view of the camera face of the device with exploded trim.
Figure 5:
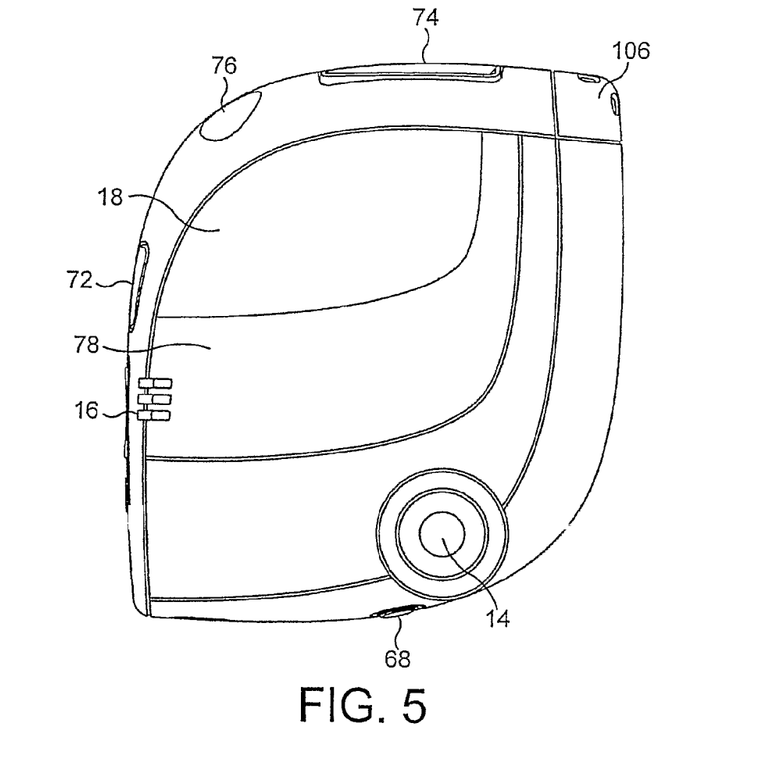
FIG. 5 is a plan view of a second camera face of the embodiment of FIG. 1.

On the imaging face 18, the lens 14 is provided for taking pictures. For the digital camera 29 of the present invention, the landscape display screen allows the photographer to see the image before the picture is taken. The lens could also be used for taking video footage. A view finder could be provided to supplement the digital display.

To promote the double A-side aspect of the described embodiment allowing the device to have two primary functionalities available to the user, a pair of trims 60 are provided around the edges of the device. The trim 60 is a bumper or buffer that hugs the sides of the device. The trim covers the split-lines 62 or seam between what would have traditionally been the A and B covers providing equal focus on or predominance to either of the major faces of the device. The trims 60 frame a region on each side of the device. On the communications A-side a frame surrounds the display 4 and input buttons. On the imaging A-side the same shaped frame surrounds the casing supporting the lens. As the frame provided by the trims 60 marks the same shaped boundary on each of the flat faces, the visual impact of each of the faces is similar and this enhances the dual aspect nature of the device. The clear separation of the main operating elements for the two principal functions of the device on to the respective A-sides enhances simple operation of the user interface. The two A-sides, could, however, be utilised to separate the functionality or operation of the device in ways other than mobile phone/photography.

The trims 60 protect the vulnerable edges and connection along the split-lines 62 of the casing parts reducing the likelihood of the elements breaking apart if the device is dropped or suffers an impact in another way. The trims 60 cushion the casing and also provide another texture that can be used to improve the grip or feel of the device. This is beneficial as the trim is located around the periphery of the device and is accordingly most likely to be gripped when the device is in use.

Problems arise with the design of the trim. It is desirably easily detachable and reattachable, wears well and does not deform on frequent release and reattachment. In the illustrated embodiment the trim is formed in two pieces. There is a snug fit between the trim and the intersection with the other exposed parts of the casing. The trim has flanges 100 at one end that overlap the casing of the front and rear faces providing a C- or U-shaped cross-section for part of its extent coming together at an abutment 102 at one extremity of the device. At this point in the illustrated embodiment the trim covers only the perpendicular side face of the device making a discontinuity where it meets each of the opposed A-faces of the device. The flat section ends of the trim meet at one extreme of the device. The abutment 102 is made neat by one of the trim elements overlying the other to provide a visually complete transition from one of the side sweeps 104, 105 to the other. At the other, in the position a tear duct would occupy in an eye of similar shape, a corner piece 106 is provided to seamlessly complete the enclosure. This corner piece provides a connection point 108 for a lanyard to allow the handset to be hung on a necklace around the user's neck or a bracelet around the user's wrist. The microphone 10 and apertures in the casing 11 and 81 are located in a region to the side of the corner pieces providing a far larger spacing than would be available along the upright viewing axis 112 that indicates the orientation for viewing the screen or operating the device, for example, using the key pad. The line between the ear piece and the speaker apertures provides an audio axis, 110 that is closely enough aligned with the diagonal to provide a significant increase in the mouth to ear distance over that available along the viewing axis.

To create seamless operating faces, the casing at the C-section regions of the trim are recessed to allow the trim to lie flush with each face. The trims 60 are attached to respective sides of the device as a mirror image along the major, in this case audio, axis 110.

Whilst covering the split-lines 62, the trim still allows access to an on/off key 64, volume/scroll key 66, camera function key 68, and voice tag key 70, known in Japan as a 'yo be ba' key all located on the side of the device. These keys are easily accessible when utilising either the mobile communication A-side or the imaging A-side and can be used in either circumstance. The operation associated with the keys located in the region of the trim may, however, differ for respective principal functions. For example the key 66 that allows volume regulation for the mobile communications function may provide contrast or other imaging function such as brightness, colour or zoom when operated when the device is operating in the photographic mode.

Also accessible through apertures in the trim in the illustrated embodiment of the invention are an infrared connector 72, an electrical connector 74, a jack for an earpiece 76, and the microphone aperture 10.

As well as covering the side split-line 62, the trim disguises the door of the battery compartment 78. This enhances the appearance of a double A-sided device as the only visible clue to the location of the battery, which is traditionally on the rear of a handset, is the line bounding the cover. This is further disguised in the illustrated embodiment with an echoing detail on the imaging face that draws the eye away from this feature. In the illustrated embodiment the trim must be removed before the battery compartment can be unlatched. Once the trim 60 has been removed, the battery compartment cover 78 can be drawn aside to allow access to the battery and the SIM card that is also preferably located below the battery for protection.

Preferably the trim is flexible and resilient and withstands tens of thousands of bends without marking. It also needs to be compatible with radio transmission from the handset. The material from which the trim is made has therefore been carefully selected to meet these criteria. The trim in this embodiment are from Surlyn reflections SG201U NC010 manufactured by Du Pont.

The material has the following properties:
Tensile Strength—44.8 Mpa
Elongation at break—>200%
Flexural Modulus—638 J/m @ 23 C
IZOD impact—266 J/m @ 23 C
Vicat Softening—190 C
Specific Gravity—1.043
Loss Tangent—0.002

Although this is only one material suitable for the trim, other materials should provide at least substantially similar loss tangents and comparable flexibility, and resilience.

For user customisation and to allow, as already discussed, ready access to the battery compartment, the trim is desirably relatively easy to remove and remount. In embodiments of the invention, the trim is a push fit to the casing, requiring no other parts to be moved or altered in order for the trim to be attached or removed. In the illustrated embodiment of the invention the trim maintains its shape when removed from the handset making positioning the trim prior to attachment as simple as possible. The cut-outs 80 in the bumper also enable it to be correctly registered with the keys and other functional and non functional details exposed when the trim is in position. For connection between the trim and the main body of the device, connectors 82, 84 are positioned on both the trim and the casing. The clips 82 on the trim snap into place in apertures 84 on the body. Although in this embodiment the trim is shown with male parts and the device casing with female parts, this can be reversed. The arrangement of this embodiment does, however, have the advantage that with the trim being flexible the protruding pins are formed from a more flexible material than the casing elements that are providing the co-operating apertures.

Figure 2:
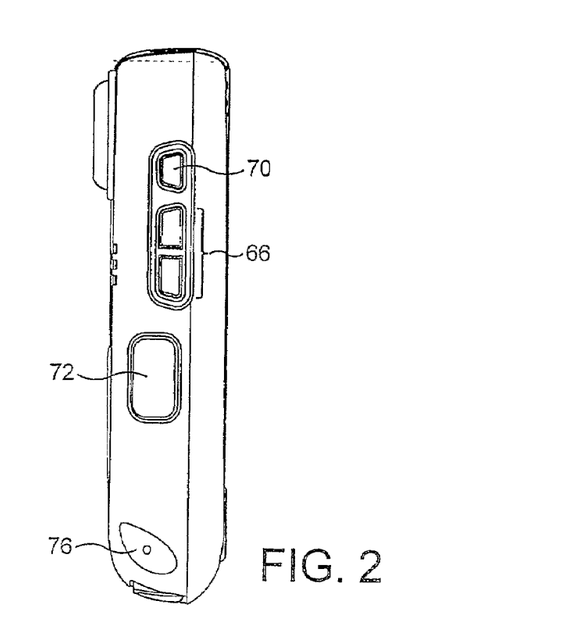
FIG. 2 is a side view of embodiment of FIG. 1.

Other arrangements including press-stud fitments have been envisaged for the connection between the trim and the supporting parts of the casing. In embodiments of the invention it is advantageous to provide a support structure to which the trim elements are connected as this provides some substance to what may otherwise be a rather flexible member in order to comply with the requirements of frequent attachment and detachment. The sides 90 seen in FIG. 4 and hidden by the trim 60 in FIG. 2 provide this function.

The removable trim provides a customisable part for a user to stamp individuality on the device. It is envisaged that replacement trims will be available in a variety of materials, colours, and textures. The texture of the trims may complement the manner of use of the device by, for example, enhancing the tactile feel of holding the device in the optimum orientation.

In embodiments of the invention the trim may have a leather outer surface. Other possibilities for the trim include having a material or plastic outer surface. To maintain the intrinsic shape of the trim preferably materials providing the outer surface of the trim will be mounted on a substrate having the desired electromagnetic and durability characteristics discussed earlier using, for example, a suitable adhesive.

The ambiguity in orientation lends itself to a twin axis approach to operation of the device. In the present embodiment the display is slightly portrait in aspect. When in the viewing orientation with the viewing axis 112 upright, the trims sweep around the bottom and left side and top and right side respectively, providing a device that instead of four sides has only two. The smooth sides promote convenient gripping of the device with the fingers along one side of the device and the thumb along the other. The upright sides allow the device to be gripped in this fashion with the hand held in a natural position for viewing while keeping the display in the correct orientation. The arrangement with two sweeping sides 104, 105 that provide either a top and a side region or a bottom and side region rather than two sides and a top and bottom allows the phone to be used in a more ergonomic fashion. It also allows the casing to be stretched along the audio axis, increasing the separation of the microphone and earpiece.

In arrangements of embodiments of the invention, the device can be moved from data input or operation input to in-call mode without the user having to rearrange the device in the hand. In data input mode if the device is held in the left hand, either the left thumb or the fingers of the right hand can be used for input, vice versa if the device is held in the right hand.

The vertical axis 112 through the display is not the same orientation as the line between the mouth and earpiece 110 located to a reasonable approximation on the furthest diametrically opposed corners of the device. Unusually, the vertical axis through the display is not, therefore, aligned with the ear when the device is held to the ear for communication.

Figure 8:
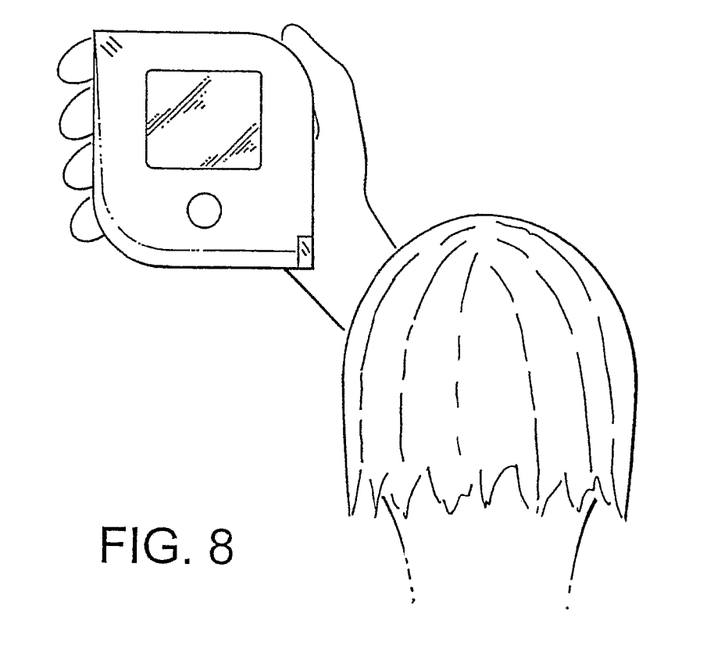
FIG. 8 is an illustration of an embodiment of the invention being viewed by a user.
Figure 9:
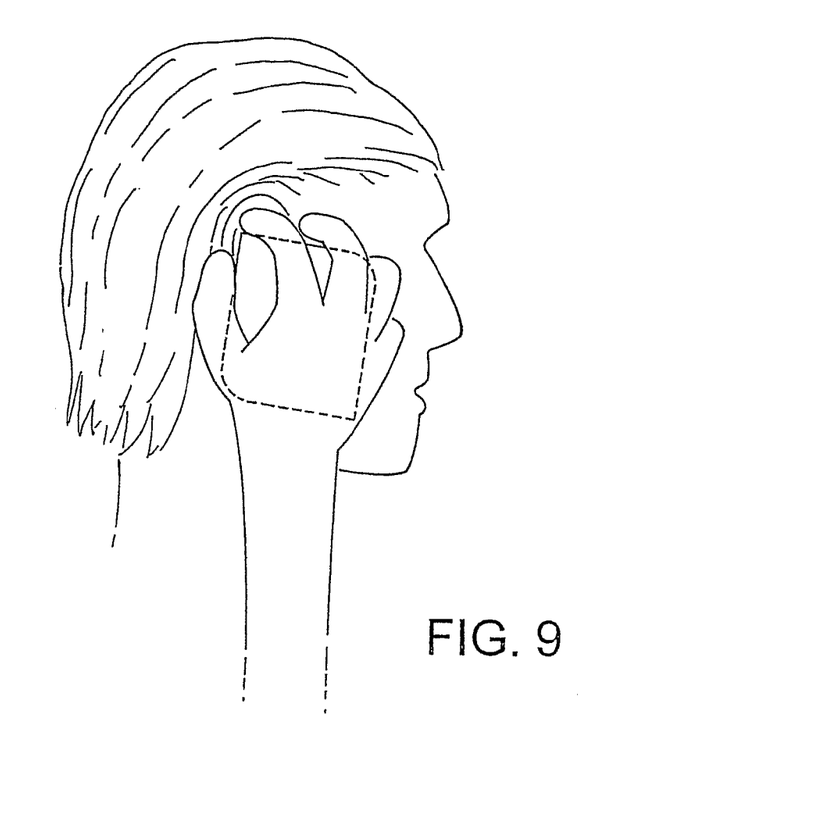
FIG. 9 is a representation of the device of FIG. 8 held to the ear of a user.

The design of the device does, however, allow the device to be moved from in front of the user's face to the user's ear without adjusting the position of the device in the user's hand. This can be seen most clearly in FIGS. 8 and 9 in which the main two holding positions of the device can be seen i.e. viewing/ data input and talking/listening.

In use when the device is gripped by the upright trim sides (FIG. 8) the audio axis 110 is substantially aligned with the users forearm. This means that the wrist does not need to be moved to any great extent as the elbow is bent to move the handheld device to the ear. A slight variation in position of the wrist may be required, but generally the device can be moved from a position in which the display is being scrutinised, to the ear where a caller can be heard and the user's own speech picked up by the microphone with a mere movement of the elbow. The curved sweeps of the device allow it to fit comfortably into the hand. The ergonomic design of the device allows the speaker to be carefully aligned between the fingers of the user when placed to the ear allowing it to be effectively and comfortably positioned for in-call use.

In the light of the foregoing description, it will be clear to the skilled man that various modifications may be made within the scope of the invention.

The present invention includes any novel feature or combination of features disclosed herein either explicitly or any generalisation thereof irrespective of whether or not it relates to the claimed invention or mitigates any or all of the problems addressed.

The invention claimed is:

1. A casing for a handheld device defining a generally planar operating face, for providing an input mechanism and a display region,
    wherein the generally planar operating face comprises a face in a plane and has a first axis that lies in the plane defining an operation orientation of the device,
    the casing providing first and second side sweeps confronting each other at respective ends,
    the confronting side sweeps defining the perimeter of the generally planar operating face and providing first and second discontinuities at their respective confrontations,
    the alignment of the first and second discontinuities defining a second axis that lies in the plane along a single longest span of the perimeter of the casing and intersects the first axis at an angle in the plane,
    wherein the first side sweep has a first length along the perimeter between the first discontinuity and the second discontinuity, greater than the longest span and
    as the first length is traced from the first discontinuity to the second discontinuity along the perimeter a displacement of the perimeter from the second axis increases and then decreases and
    wherein the second side sweep has a second length along the perimeter between the first discontinuity and the second discontinuity, greater than the longest span and as the second length is traced from the first discontinuity to the second discontinuity along the perimeter a displacement of the perimeter from the second axis increases and then decreases.

2. A casing for a handheld device in accordance with claim 1 wherein an audio axis for carrying a spaced microphone and speaker is aligned with the second axis.

3. A casing for a handheld device in accordance with claim 1 wherein the confrontations comprises a physical convergence of the respective side sweeps.

4. A casing for a handheld device in accordance with claim 1 wherein the confrontations is provided by user detachable elements carried by the casing.

5. A casing for a handheld device in accordance with claim 1 wherein the second axis lies along a diagonal.

6. A casing for a handheld device in accordance with claim 5 wherein the other diagonal is truncated.

7. A casing for a handheld device in accordance with claim 6 wherein the truncated diagonal runs terminates at a rounded corner.

8. A casing for a handheld device in accordance with claim 6 wherein the truncated diagonal terminates at a rounded corner at both extremities.

9. A casing for a handheld device in accordance with claim 8 wherein the rounded corners provide two sweeping sides.

10. A casing for a handheld device in accordance with claim 5 wherein the diagonal is coincident with the second axis and is elongate and terminates at a point.

11. A casing for a handheld device in accordance with claim 5 wherein the diagonal is coincident with the second axis and is elongate and terminates at a point at both extremities.

12. A casing for a handheld device in accordance with claim 1 wherein the first axis and second axis intersect in the display region of the face.

13. A casing for a handheld device in accordance with claim 1 wherein the first axis and second axis intersect at an input region of the face.

14. A casing for a handheld device in accordance with claim 1 wherein the face is generally rectangular.

15. A casing for a handheld device in accordance with claim 14 wherein the rectangle is generally square.

16. A handheld telecommunications device comprising a casing according to claim 1.

17. A handheld telecommunications device according to claim 16 wherein an audio axis for carrying a spaced microphone and speaker is aligned with the second axis, and wherein the first axis and audio axis are misaligned such that when the device is moved from the viewing to the listening position the rotation of the device required for alignment of the speaker and microphone outlets with the ear and mouth respectively of the user is greater than that required for alignment of the viewing axis with the ear and mouth.

18. A handheld telecommunications device according to claim 16 wherein the device can be held in the hand in the proper orientation for viewing the display and lifted to the ear in proper orientation for audio communication whilst maintaining substantially the same lateral position of the user's wrist.

19. A casing as claimed in claim 1, wherein the casing has substantially 180 degree rotational symmetry.

20. A casing as claimed in claim 1 wherein an audio axis for carrying a spaced microphone and speaker is aligned with the second axis and wherein the display region lies between the microphone and the speaker.

* * * * *